July 5, 1932.  J. G. COUTANT  1,866,193
PURIFICATION OF FURNACE OR OTHER GASES
Filed Dec. 8, 1930

INVENTOR
Jay Gould Coutant
BY
Morrison, Kennedy & Campbell
ATTORNEYS.

Patented July 5, 1932

1,866,193

UNITED STATES PATENT OFFICE

JAY GOULD COUTANT, OF NEW YORK, N. Y.

PURIFICATION OF FURNACE OR OTHER GASES

Application filed December 8, 1930, Serial No. 500,696, and in France December 10, 1929.

This invention relates to purification of furnace or other gases and is of practical utility for the treatment of various gases or fumes containing solid, volatile, acid or other components which it is desirable should be removed whether for rendering the gases unobjectionable and harmless or for the recovery of such components. The invention is useful in connection with industrial processes or furnaces, for example for the treatment of the flue gases from steam boiler furnaces burning pulverized coal; and is useful in connection with incinerators and various other industrial plants.

Among the general objects of the present invention are to afford a gas purifying apparatus which will be simple and efficient in operation, the apparatus being inexpensive of construction yet strong and durable and of minimum bulk or volume. The main function of the invention is to extract, collect and dispose of solid particles contained in the gases, especially by treatment by water or equivalent liquid, and to remove, absorb and neutralize volatile constituents of the gases, and to absorb, condense and remove acid constituents; and where sulphurous compounds or fumes are present the water may contain a neutralizing agent.

A particular object of the invention is to so treat the gases as to minimize their outgoing temperature and therefore their volume, as well as their water content; this permitting flues and stacks of smaller dimensions and fans therein of less size and power.

Another object is to afford, in a purifying apparatus, a system of elements, occupying the purifying chamber, which will be non-corrosible and readily cleanable internally and externally.

A further object is to afford automatic control of the operation, namely by means of a thermo or other sensitive device located in the outgoing gases and connections therefrom for controlling the rate of water supply to the purifying apparatus, thereby insuring adequate water and thorough treatment, and yet minimizing in the use of water during slack periods.

Further objects and advantages of the invention will be explained in the following description of one or more illustrative embodiments thereof or will be understood to those conversant with the subject. To the attainment of such objects and advantages the present invention consists in the apparatus, and the features of operation, combination, arrangement and construction herein illustrated or described.

In the accompanying drawing Figure 1 may be considered a diagrammatic elevation of an apparatus for purifying furnace or other gases in accordance with the present invention.

Fig. 2 is a fragmentary perspective view of certain details including some of the tubular elements and their surroundings.

Fig. 3, on a larger scale, illustrates one of the tubular elements detached.

Figure 1:
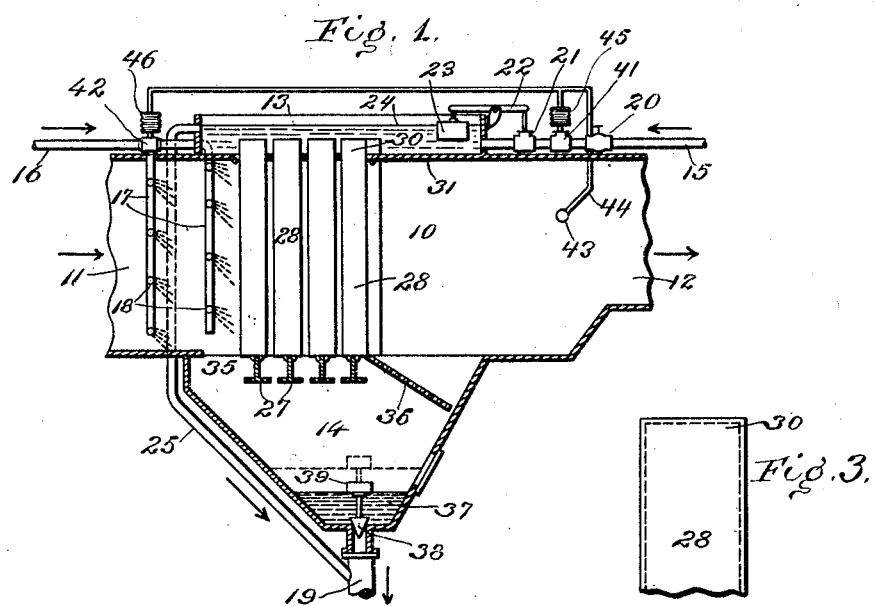

Referring to Fig. 1 the central part of the apparatus may be defined as a purifying chamber 10, including the entire space within which the purifying steps are performed. At one lateral side is shown an inlet flue or pipe 11 bringing the gases into the chamber and at another side, for example the right is a similar outgoing flue 12, but preferably of reduced dimensions. The apparatus may thus be considered as inserted in a flue 11—12 which may lead to a stack or other exit, or on the other hand the apparatus hereof may be located at the top end of a stack or ascending flue leading from the furnace to the atmosphere. Above the chamber 10 is shown a reservoir 13, for example for holding a body of water to be circulated in a manner to take part in the purifying action. Below the chamber 10 is a collecting vessel 14 which may converge like a hopper at the lower end.

The reservoir 13 is shown as supplied with water by a pipe 15, at the right side. At the left side is shown a water pipe 16 supplying water to a series of downtakes 17 which in turn connect with horizontal spray pipes 18 arranged to direct fine sprays of water forwardly and at a downward incline within the central chamber 10. The water or other liquid received in the collecting vessel 14 may be lead away by an outlet pipe 19.

The supply of water by pipe 15 to the reservoir 13 may be controlled first by a hand valve 20 and second by a float valve 21 operated by a lever 22 connected to a float 23, so that when the water 24 rises in the reservoir to the overflow point the supply will be cut off. An overflow pipe 25 is shown by which surplus water in the reservoir may be conducted down to join with that leaving the collecting vessel by the outlet 19.

Figure 3:
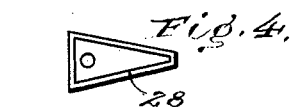
Figure 4:
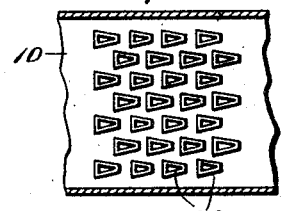
Fig. 4 is a top plan view of the element shown in Fig. 3.

The gases passing through the purifying chamber are herein treated not only by the sprays from pipes 18 but from a series of members or elements, the surfaces of which are maintained in a wet condition by water from the reservoir 13. The following construction is shown. A set of beams 27 is shown as supporting a set of upright elements 28, which might be inclined, so long as they have a vertical dimension. The elements 28 are preferably hollow or tubular so that they may be internally cooled to assist the maintenance of wet exterior surfaces. As shown in Figs. 3 and 4 each hollow element 28 is preferably furnished with a bottom outlet occupied by a drain plug 29 permitting the element to be drained and cleaned at intervals.

As a means of wetting the elements 28 by water from the reservoir 13 said elements are shown as having their upper ends 30 extended through the bottom plate or wall 31 of the reservoir, which also constitutes the top wall of the chamber 10. As shown more in detail in Fig. 2 the reservoir wall 31 is formed with apertures 32 through which the hollow elements are passed. The elements are shown triangular in cross section, and the apertures 32 are of corresponding shape, but are slightly larger and with spacing projections 33 so as to produce a system of discharge openings or cracks 34 between the elements and the edges of the aperture, thus allowing water to leak or flow downwardly from the reservoir at all sides of the elements.

The first or left side of the chamber 10 is shown as connecting by an opening 35 with the interior of the vessel 14, so that the sprayed liquid can pass downwardly thereinto. At the right, between the vessel and the right side of the chamber is shown a perforated screen 36 which permits gases to advance, under restriction, while permitting accumulated liquids to descend to the collecting point. This insures that all water condensing in the latter part of chamber 10 will pass downwardly into the collecting vessel, and insures that practically all of the gases will pass through the center of the chamber 10 and thus subject itself to the wetted surfaces of the tubular elements. The opening 35 allows dust and solids to be thrown down into the vessel 14 while the screen 36 tends to bar exit of solids and suspended liquids.

In the collecting vessel the liquid 37 is shown as controlled by a float valve 38, the float 39 of which permits the water to accumulate to a certain point, as shown, then bringing about a sudden opening of the valve when the water rises to the dotted line level, so that the collected liquid will be flushed at intervals. Instead of this arrangement there may be a continuous flushing of the vessel, by any desired means.

There is disclosed an automatic means of controlling the water supply to the purifying sprays and elements. Thus a valve 41 is shown inserted in the pipe 15 and a similar valve 42 in the pipe 16. In the outlet flue 12, and subject to the action of the outgoing gases, is a sensitive device 43, responding for example to changes of temperature of the gases. This may for example be a closed pipe or vessel with thin walls and of suitable extent, to constitute a gas thermometer, with expansion corresponding to the temperature; or there may be a thermo-couple electric device. The device shown is connected by a small pipe 44 with a pressure responsive device or bellows 45 adapted to expand upon a rise of temperature and pressure and thereby cause a wider opening of the valve 41. Similarly the pipe 44 leads to a bellows 46 controlling the valve 42.

By such control, when the gases leave at too hot a temperature, indicating inadequate water treatment, the valves 41 and 42 are opened further, supplying more water to the sprays, and higher water in the reservoir, giving greater flow as sheets of water descending the exposed sides of the wet elements. At other times the flow is reduced, approximately in proportion to the gas flow, effecting large savings in operating expense.

Figure 2:
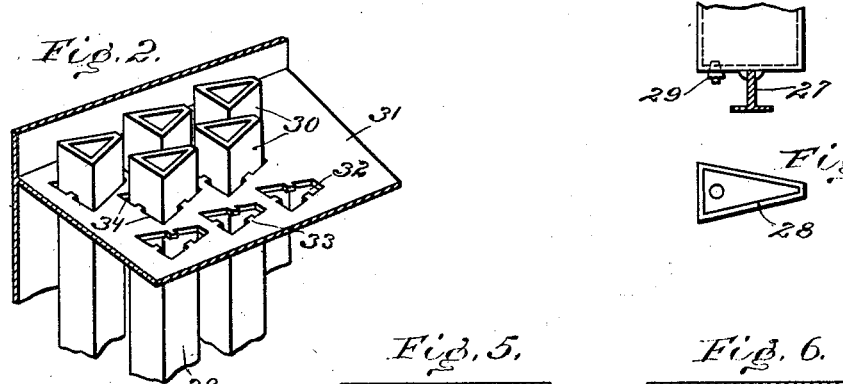
Figures 5, 6:
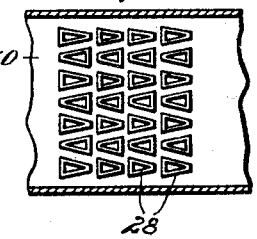
Fig. 5 is a top plan view showing the entire series or system of tubular elements in one practical arrangement.
Fig. 6 is similar to Fig. 5, but shows a modified arrangement of the system of elements.

The non-square or triangular elements 28 ensure turbulent gas flow through the chamber, and thorough contact with the films of water, which action is enhanced by the staggered arrangement seen in Figs. 2 and 5. Another effective arrangement is as shown in Fig. 6, wherein better access is given for cleaning the exposed exteriors of the elements, as may be needed, by steam, water or sand blasts, or mechanical cleaners. The elements are preferably of cast iron, which resists corrosion.

The water 24 in reservoir 13 also fills elements 28 whose tops 30 are submerged, and cools them. An interior circulation occurs, warm water ascending and cool water descending by natural action, which may be assisted.

Figure 7:
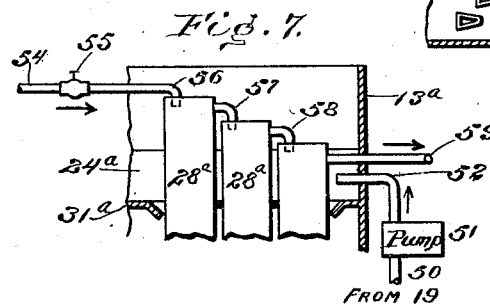
Fig. 7 is a diagrammatic elevation similar to Fig. 1 and showing a modified form of apparatus.

In the Fig. 7 modification the circulation is kept separate in the reservoir 13ª, the water 24ª leaking through the bottom plate 31ª to wet the element exteriors, and within the elements 28ª for cooling them, the water thus being heated, while kept clean, and so becoming available for heating purposes, for feed to a boiler or other uses; the apparatus serving thus the purposes of an open feedwater heater, and affording economies.

A pipe 50 is shown, supplying liquid or water to the reservoir 13ª, for example liquid collected in the vessel 14 and recirculated, as by a pump 51, whose discharge flows by pipe 52 to the reservoir, from which the liquid flows down the narrow crevices in the plate 31ª, forming sheets of water at the outer surfaces of the elements, and thence back to the vessel, whence it may be drawn off as desired for treatment, neutralization or recovery of materials.

The elements 28ª are of graduated height, all projecting above the liquid in 13ª, and pipes 54 supply water thereto, these pipes being regulable as by valves 55, connected by pipes 56 to the tallest elements, which overflow by pipes 57 to the next tallest, and so on, pipes 58 delivering to the shortest, and these discharging by outlet pipes 59 leading to the place of use of the water, which has circulated through the elements and taken up much heat given up by the gases.

When the liquid is expected to absorb acid fumes it may be caused to contain milk of lime or other agent capable of neutralizing the acid so that the waste liquid may be discharged into rivers without causing pollution.

The great cooling of the gases contracts them, permitting reduced outgoing flues, as indicated, and smaller fans and chimneys. The moisture content is at the same time reduced to a minimum, and the prolongation of the chamber permits the settling of suspended drops, which flow down into the collecting vessel.

Recirculation economizes in water and neutralizing chemicals and allows the use of water for sluicing of furnace ashes, saving power. The valve 38 may discharge for ash sluicing purposes, or other uses in a furnace, or the discharge may be collected, dried and used for fuel or fertilizer.

With this invention there is a progressive treatment and cooling of the gases or fumes, which may be at say 450° F. Dust and volatiles are first extracted by the sprays and thrown downwardly. The gases, saturated with water, and accompanied by some vapor, next reach the cooled element system, covered with flowing water films, and so spaced as to cause eddy currents and intimate contact. This condenses the vapors and wets the remaining dust particles, reducing the gas volume and velocity so that the wet particles and drops may precipitate in the chamber or after chamber. All the removed matters collect in the vessel below, which has an access door at one side.

A value of the thermo-device 43 is that it may be adjusted to ensure the proper cooling of the gases, for example to a temperature between 80° and 160° F. At the same time the purifying action is controlled correspondingly. When hot gases arrive in increased quantities the water sprays and films will increase in proportion. The greater the water supply the higher the hydrostatic head will be in the reservoir and the faster the rate of flow through the bottom apertures, while the sprays are directly increased at the same time.

The proper maintenance of the water films or sheets upon the elements depends on keeping the elements cooled below the temperature of the water, which is done by the interior circulation. The films are kept flowing smooth by having the narrow openings 34 formed with a suitable slant, or at an angle, such as 7°.

It will thus be seen that an apparatus for the purification of furnace or other gases has been disclosed embodying the principles and attaining the advantages of the invention. Since various matters of operation, combination, arrangement and construction may be modified without departing from the principles, it is not intended to limit the invention to such matters except so far as set forth in the appended claims.

What is claimed is:

1. In gas purifying apparatus a purifying chamber, with flues leading the gases into one side and out of the other side of the chamber, a system of hollow tubular elements traversing the chamber from above to below, means for flowing water downwardly over the outer surfaces of the elements, and for circulating water through the interior thereof, comprising a water reservoir above the chamber with apertured bottom, the tubular elements extending up through such apertures to points above the water therein, means supplying water to the reservoir to pass down as an exterior film on the elements, and a separate means for circulating water through the elements to cool them and preheat the water.

2. In gas purifying apparatus a purifying chamber, with flues leading the gases into one side and out of the other side of the chamber, a system of hollow tubular elements traversing the chamber from above to below, a water reservoir above the chamber with apertured bottom, the tubular elements extending up through such apertures to points above the water therein, means supplying water to the reservoir to pass down as an exterior film on the elements, and a separate means for circulating water through the elements to cool them and preheat the water.

3. Apparatus as in claim 2 and wherein the tubular elements project up to different heights above the water in the vessel and are arranged to overflow from a higher to a lower element in cascade fashion for progressive circulation through the elements.

4. In gas purifying apparatus a purifying chamber, with flues leading the gases into one side and out another side of the chamber, a system of open top hollow tubular vessels traversing the chamber from above to below, a water reservoir above the chamber with apertured bottom, the tubular vessels extending up through such bottom apertures with leaking fit, means supplying water to the reservoir to pass down as exterior films on the outer sides of the vessels, and the vessels having water circulation through the interior thereof to cool them.

5. Apparatus as in claim 4 and wherein the open tops of the vessels are submerged in the water in the reservoir and thereby receive circulation water therefrom.

6. Apparatus as in claim 4 and wherein is thermo-control means operated by the temperature of the outgoing gases for regulating the means supplying water to the reservoir to increase the water supply rate with increase of temperature and vice versa.

7. In gas purifying apparatus a purifying chamber, with flues leading the gases into one side and out another side of the chamber, a system of tubular vessels traversing the chamber from above to below, a water reservoir above the chamber with apertured bottom, the tubular vessels extending up through such bottom apertures to receive water from the reservoir-means supplying water to the reservoir, the vessels having water circulation through the interior thereof to cool them, and having means for removal of sediment therefrom.

8. In gas purifying apparatus a purifying chamber, with flues leading the gases into one side and out another side of the chamber, a system of hollow tubular vessels traversing the chamber from above to below, a water reservoir above the chamber with apertured bottom, the tubular vessels extending up through such bottom apertures with leaking fit, and means supplying water to the reservoir and vessels; the vessels having open top ends and means for draining at their bottom ends.

In testimony whereof, this specification has been duly signed by:

JAY GOULD COUTANT.